US009710126B2

(12) United States Patent
Engström et al.

(10) Patent No.: US 9,710,126 B2
(45) Date of Patent: Jul. 18, 2017

(54) METHOD AND APPARATUS FOR DISPLAYING A PREVIEW OF AN APPLICATION TO A USER

(71) Applicant: BlackBerry Limited, Waterloo (CA)

(72) Inventors: Christopher Engström, Lund (SE); Dan Zacharias Gärdenfors, Malmö (SE); David Andrew Brown, Kitchener (CA)

(73) Assignee: BlackBerry Limited, Waterloo, Ontario (CA)

(*) Notice: Subject to any disclaimer, the term of this patent is extended or adjusted under 35 U.S.C. 154(b) by 339 days.

(21) Appl. No.: 14/056,722

(22) Filed: Oct. 17, 2013

(65) Prior Publication Data

US 2015/0113471 A1    Apr. 23, 2015

(51) Int. Cl.
| | |
|---|---|
| *G06F 3/0481* | (2013.01) |
| *G06F 1/16* | (2006.01) |
| *G06F 3/0482* | (2013.01) |
| *G06F 3/0488* | (2013.01) |
| *G06F 9/44* | (2006.01) |
| *G06Q 10/10* | (2012.01) |

(52) U.S. Cl.
CPC .......... *G06F 3/0481* (2013.01); *G06F 1/1626* (2013.01); *G06F 3/0482* (2013.01); *G06F 3/04883* (2013.01); *G06F 9/4443* (2013.01); *G06Q 10/10* (2013.01)

(58) Field of Classification Search
CPC ..................................................... G06F 3/0481
USPC ......................................................... 715/781
See application file for complete search history.

(56) References Cited

U.S. PATENT DOCUMENTS

| | | | | |
|---|---|---|---|---|
| 7,302,698 | B1 * | 11/2007 | Proudler ................. | G06F 21/57 713/187 |
| 8,150,777 | B1 * | 4/2012 | Tadayon ............ | G06Q 30/0201 705/30 |
| 8,370,743 | B2 * | 2/2013 | Bala ....................... | G06F 3/0481 715/705 |
| 9,160,631 | B1 * | 10/2015 | Lluncor ................. | H04L 41/22 |
| 2009/0290786 | A1 * | 11/2009 | Stevens ................... | G06T 7/593 382/154 |

(Continued)

FOREIGN PATENT DOCUMENTS

| | | |
|---|---|---|
| EP | 2306290 | 4/2011 |
| EP | 2560087 | 2/2013 |

(Continued)

OTHER PUBLICATIONS

Extended European Search Report issued in EP Application No. 14185986.8 on Mar. 13, 2015; 9 pages (47620-EP-EPA).

*Primary Examiner* — Reza Nabi
(74) *Attorney, Agent, or Firm* — Fish & Richardson P.C.

(57) ABSTRACT

A method in a portable electronic device for providing a user with an improved user interface is described. The electronic device includes one or more processors and memory including instructions which when executed by the one or more processors cause the electronic device to perform the method. While content in a user interface of a first application is displayed, a first user input is detected. In response to the first user input, at least a preview for a second application is displayed. In some instances, the second application is selected automatically at least partly in dependence on the content displayed in the user interface of the first application.

18 Claims, 10 Drawing Sheets

(56) References Cited

U.S. PATENT DOCUMENTS

| | | | | |
|---|---|---|---|---|
| 2010/0050101 | A1* | 2/2010 | Baik | G06Q 10/10 715/764 |
| 2011/0028138 | A1* | 2/2011 | Davies-Moore | G06F 3/04817 455/418 |
| 2011/0252364 | A1* | 10/2011 | Anzures | G06F 3/04883 715/790 |
| 2012/0235930 | A1* | 9/2012 | Lazaridis | G06F 3/017 345/173 |
| 2012/0304108 | A1* | 11/2012 | Jarrett | G06F 3/04883 715/781 |
| 2013/0219343 | A1* | 8/2013 | Nan | G06F 3/0486 715/838 |
| 2013/0311794 | A1* | 11/2013 | Stewart | G06F 1/26 713/300 |
| 2013/0346872 | A1* | 12/2013 | Scott | G06F 3/0237 715/738 |
| 2015/0365306 | A1* | 12/2015 | Chaudhri | G06F 3/0416 715/736 |
| 2016/0179816 | A1* | 6/2016 | Glover | G06F 17/3053 707/749 |
| 2016/0299984 | A1* | 10/2016 | Scott | G06F 17/3087 |
| 2016/0360382 | A1* | 12/2016 | Gross | G06F 3/0488 |
| 2017/0010777 | A1* | 1/2017 | Rice | G06F 17/2247 |

FOREIGN PATENT DOCUMENTS

| | | |
|---|---|---|
| EP | 2624118 | 8/2013 |
| EP | 2631759 | 8/2013 |
| WO | 2012/097385 | 7/2012 |
| WO | 2012/128795 | 9/2012 |
| WO | 2013/097895 | 7/2013 |

\* cited by examiner

METHOD AND APPARATUS FOR DISPLAYING A PREVIEW OF AN APPLICATION TO A USER

FIELD OF THE TECHNOLOGY

The present disclosure relates to electronic devices and, more particularly, the generation and output of a preview of an application to a user of an electronic device.

BACKGROUND

Electronic devices that use computing apparatus to provide visual information to users via one or more displays are now in ubiquitous use, for example, as portable electronic devices in the form of handheld computers, smart phones, tablet computers, and laptop computers, and as non-portable electronic devices in the form of desktop computers or smart televisions. The display or displays that provide visual information from the electronic devices to the users may be separable from and coupleable to the electronic devices, or may be integrated therewith.

The electronic devices may generate user interfaces for display on the display coupled to the device for facilitating user interaction with, and operation of, the device via one or more user inputs. The user interfaces comprise visual elements that can be arranged in various manners on the screen. The visual elements provided in the user interface may together represent elements of, for example, an operating system of the electronic device and applications supported thereby. Indirect interaction, typically by pointer-based user inputs such as trackpads, trackballs, mice and cursors, and direct interaction, typically by touch-based user inputs such as touch screens and multitouch screens, can provide controls usable to allow interaction with the user interface. User interfaces having a desktop environment that include windows, icons, menus and a pointer as visual elements are known whereas user interfaces having a more touch-friendly paradigm may also be provided. Touch-based mobile devices may include both touch-friendly and desktop environment user interfaces between which a user may alternate, if, for example, an external keyboard, mouse and display are connected to convert the touch-screen mobile device into a more conventional computer implementation.

The user interfaces provide relatively user friendly means of control of electronic devices and applications. Nevertheless, users are often required to perform a large number of interactions on the electronic device in order to cause the electronic device to execute an application.

BRIEF DESCRIPTION OF THE DRAWINGS

Examples of the present proposed approach will now be described in detail with reference to the accompanying drawings, in which.

DETAILED DESCRIPTION

Figure 1:
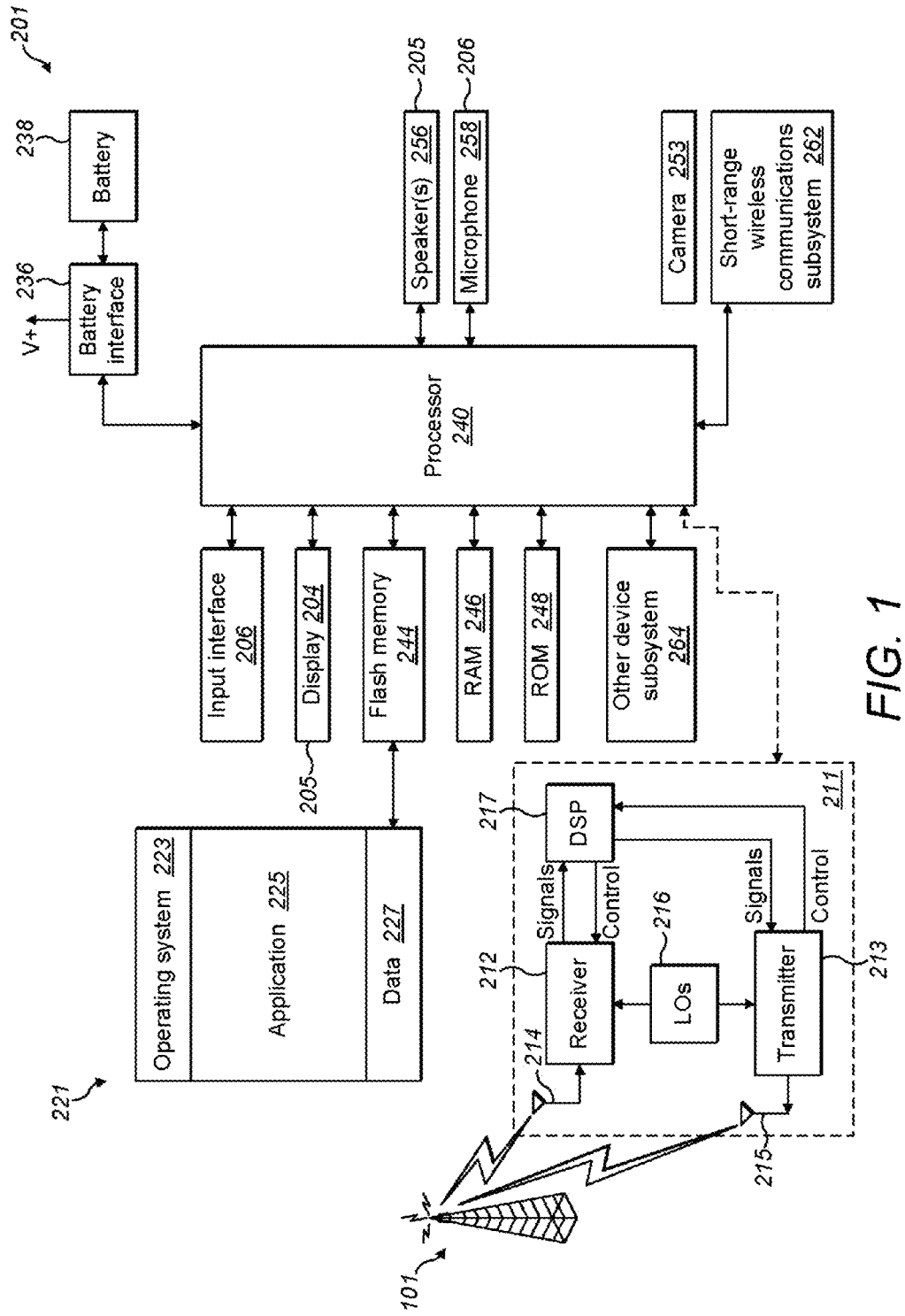
FIG. 1 is a block diagram illustrating an electronic device in accordance with example embodiments of the present disclosure.

The present applicants have realised that some users may execute applications on the electronic device in a reasonably predictable way. For example, this may be related to other recently executed applications or based on recently received messages. However, typically a user must provide the same input each time they wish to execute a given application. This can be monotonous, time-consuming and frustrating for the user.

In some embodiments, there is provided a method in a portable electronic device, comprising: displaying content in a user interface of a first application; detecting a first user input; and responsive to the first user input, displaying at least a preview for a second application; wherein the second application is selected automatically at least partly in dependence on the content displayed in the user interface of the first application. The preview may comprise at least part of a graphical user interface of the second application and/or the preview may comprise content from the second application. The user interface of the first application may be displayed while the preview for the second application is displayed. The user interface of the first application may be displayed at a reduced size while the preview is displayed.

In some embodiments, the preview is based at least in part on the content in the user interface of the first application.

In some embodiments, the preview is based at least in part on an output of the second application and the output of the second application is based at least in part on the content in the user interface of the first application In some embodiments, the method further comprises: detecting a second user input; and responsive to the second user input: ceasing displaying the user interface of the first application; executing the second application; and displaying content in a user interface of the second application; wherein the content displayed in the user interface of the second application is based at least in part on the content displayed in the user interface of the first application. The first user input may comprise a first gesture and the second user input may comprise a second gesture. The first gesture may comprise a swipe gesture substantially in a first direction and the second gesture may comprise a continuation of the first user input.

In some embodiments, the method further comprises: detecting a third user input; and responsive to the third user input, ceasing displaying the preview for the second application. The method may further comprise: responsive to the first user input, suspending execution of the first application; and responsive to the third user input, resuming execution of the first application.

In some embodiments, selecting the second application comprises: determining one or more endpoints at least partly in dependence on the content displayed in the user interface of the first application, each endpoint being associated with an application in a plurality of applications; calculating a confidence measure for each endpoint; selecting the endpoint having the highest confidence measure; and selecting the application associated with the endpoint as the second application. The preview for the second application may be based on the selected endpoint, the selected endpoint being associated with the second application. Each endpoint may comprise a predetermined procedure within the associated application. The confidence measure for an endpoint may be based at least in part on whether an application associated with the endpoint was executed based on a preview for the second application. The confidence measure may be based at least in part on predetermined relationships between data types and applications.

In some embodiments, determining a subset comprises: determining one or more items of data from the content displayed in the user interface of the first application; and determining a data type for each of the items of data; wherein each endpoint is associated with one or more of the determined data types.

In some embodiments, the method further comprises: receiving a fourth user input; and responsive to the fourth user input, displaying at least a preview for a third application; wherein the third application is the application associated with the endpoint having the next highest confidence measure.

In some embodiments, executing the second application comprises: identifying an endpoint associated with the second application; wherein the user interface of the second application is adapted based on the endpoint.

In some embodiments, the method further comprises: detecting a sixth user input; and responsive to the sixth user input: ceasing displaying the user interface of the second application; and displaying content in the user interface of the first application.

In some embodiments, the content in the user interface for the second application is adapted based on the content in the user interface of the first application. The user interface for the second application may comprise one or more user controls for receiving data from the user, wherein the one or more user controls have at least part of the content in the user interface for the first application as a default value.

In some embodiments, there is provided an electronic device, comprising: one or more processors; and memory comprising instructions which, when executed by the one or more processors, cause the electronic device to perform any of the methods disclosed herein.

In some embodiments, there is provided a computer readable medium comprising instructions capable of causing an electronic device to perform any of the methods disclosed herein.

Optional features of embodiments of methods described above should also be considered to be within the scope of the present disclosure.

Electronic Device

Reference will now be made to FIG. 1 which illustrates an electronic device 201 in which example embodiments described in the present disclosure can be applied.

In the illustrated example embodiment, the electronic device 201 is a communication device and, more particularly, is a mobile communication device having data and voice communication capabilities, and the capability to communicate with other computer systems; for example, via the Internet.

Depending on the functionality provided by the electronic device 201, in various example embodiments the electronic device 201 may be a multiple-mode communication device configured for both data and voice communication, a mobile telephone, such as a phone, a wearable computer such as a watch, a tablet computer such as a slate computer, a personal digital assistant (PDA), or a computer system. The electronic device 201 may take other forms apart from those specifically listed above. The electronic device may also be referred to as a mobile communications device, a communication device, a mobile device and, in some cases, as a device.

The electronic device 201 includes a controller including one or more processors 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 is communicably coupled with additional device subsystems including one or more output interfaces 205 (such as a display 204 and/or a speaker 256 and/or a video output port (not shown) for coupling the device to an external display (not shown)), one or more input interfaces 206 (such as microphone 258, keyboard (not shown), control buttons (not shown), and/or a touch-sensitive overlay (not shown) associated with a touchscreen display 204), memory (such as random access memory (RAM) 246, read only memory (ROM) 248, etc.), a short-range wireless communication subsystem 262 and other device subsystems generally designated as 264.

In at least some example embodiments, the electronic device 201 may include a touchscreen display which acts as both an input interface 206 (i.e. touch-sensitive overlay) and an output interface 205 (i.e. display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

As noted above, in some example embodiments, the electronic device 201 may include a communication subsystem 211 which allows the electronic device 201 to communicate over a wireless network 101 (and/or via a wired link (not shown)). The communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to the electronic device 201 and a single antenna may be shared by both receiver and transmitter. The particular design of the wireless communication subsystem 211 depends on the wireless network 101 in which electronic device 201 is intended to operate. The wireless network 101 may, for example, be a cellular (such as GSM, GPRS, CDMA or EDGE) and/or a non-cellular network (for example local WiFi networks).

In at least some example embodiments, the electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212 and are demodulated and decoded by the Digital Signal Processor (DSP) 217. In a similar manner, signals to be transmitted are processed, including modulation and encoding, for example, by the DSP 217 and are input to the transmitter 213 for transmission to the wireless network 101 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 stores data 227 in an erasable persistent memory, which in one example embodiment is the flash memory 244. In various example embodiments, the data 227 includes service data including information required by the electronic device 201 to establish and maintain communication with the wireless network 101. The data 227 may also include user application data such as email messages, address book and contact information, calendar and schedule information, notepad documents, image files, and other commonly stored user information stored on the electronic device 201 by its user, and other data. The data 227 stored in the persistent memory of the electronic device 201 may be organized, at least partially, into one or more databases or data stores. The databases or data stores may contain data items of the same data type or associated with the same application. For example, email messages, contact records, and task items may be stored in individual databases within the device memory.

The electronic device 201 may, in some example embodiments, be operable to achieve data communication, such as to receive an email message stored in a repository of email messages of a user of the device that is stored locally to the device or remotely at another device, or to download a Web page. The received data will be processed by the communication subsystem 211 and input to the processor 240 for further processing. For example, a downloaded Web page may be further processed by a browser application or an email message may be processed by an email messaging application and output to the display 204. A user of the electronic device 201 may also compose data items, such as email messages; for example, using the input devices in conjunction with the display 204. These composed items may be transmitted through the communication subsystem 211 over the wireless network 101.

The processor 240 operates under stored program control and executes software modules 221 stored in memory such as persistent memory; for example, in the flash memory 244. As illustrated in FIG. 1, the software modules 221 include operating system software 223 and other software applications 225 such as a web browser or an email client in accordance with the present disclosure. The web browser or email client may allow the user to access, view, navigate and interact with messages stored in a remote or local repository via a user interface.

The web browser or email client in accordance with the present disclosure may be provided as a computer software product. The computer software product may be provided in, on or supported by a computer readable medium which could be provided as all possible permanent and non-permanent forms of computer readable medium either transitory in nature, such as in a data transmission signal for example sent over the internet, or non-transitory in nature such as in the RAM 246 of the device 201 or other, non-volatile storage such as memory 230. On the other hand the computer readable medium may be a non-transitory computer readable medium comprising all computer-readable media, with the sole exception being a transitory, propagating signal.

Figure 2:
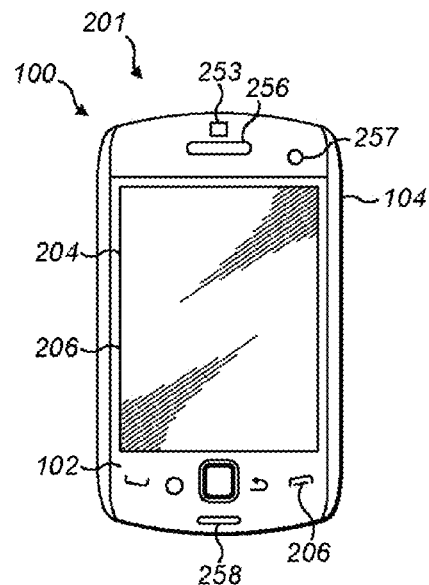
FIG. 2 is a front view of a phone in accordance with example embodiments of the present disclosure.

Referring now to FIG. 2, the electronic device 201 could be a smart phone 100 which may have the ability to run third party applications which are stored on the phone and may include the components discussed above with reference to FIG. 1 or a subset of those components.

Figure 3:
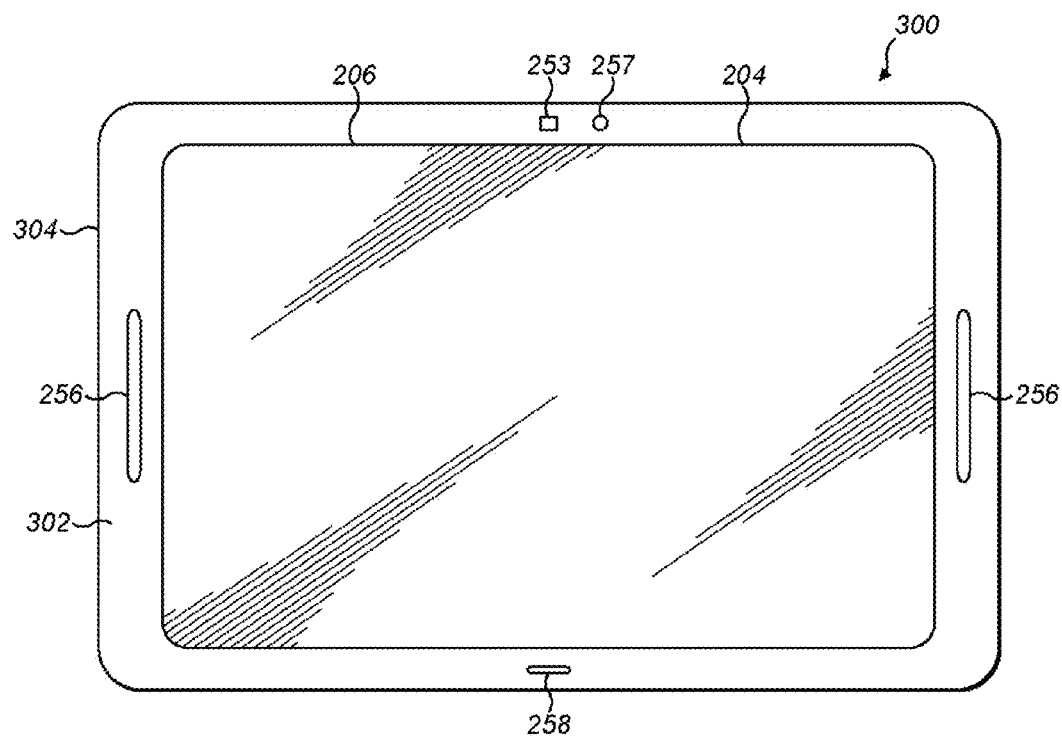
FIG. 3 is a front view of a tablet computer is accordance with example embodiments of the present disclosure.

Referring now to FIG. 3, a front view of another example of an electronic device 201, a tablet computer 300, is illustrated. The tablet computer 300 may include many of the same features and components of the phone 100 of FIG. 2. However, the tablet computer 300 of FIG. 3 is generally larger than the phone 100. The tablet computer 300 may include the components discussed above with reference to FIG. 1 or a subset of those components.

In embodiments, the smart phone 100 and tablet computer 300 are provided with an operating system having a touch-friendly user-interface which primarily uses touch-based gesture input from the touch screen to control the device. In addition, the smart phone 100 and tablet computer 300 may also be provided a more conventional desktop environment user-interface. A user may select the desktop environment user interface to control the device, for example, using primarily pointer-based gestures received from an external mouse and keyboard connected wirelessly via short-range wireless communication subsystem 262. In addition, the smart phone 100 and tablet computer 300 may be coupled to external displays, such as TFT monitors via video output ports. In this way, the mobile electronic devices may be converted for use as more conventional desktop electronic devices.

Displaying a Preview for an Application

In some embodiments, the electronic device 201 comprises sequences of instructions stored, for example, in RAM that when executed by one or more processors, cause the electronic device to be configured to display a preview of a second application to the user. In particular, the preview may be displayed to a user while content in a user interface of a first application is displayed. In some cases, the second application is selected based at least in part on the content displayed in the user interface of the first application. The preview may be displayed to the user in response to a user input.

The preview can comprise content from the second application, for example, a portion of the content that is displayed in the user interface of the second application. This may be displayed in a user interface different from that of the second application. The preview can additionally or alternatively comprise at least a part of the user interface of the second application itself.

Figure 4:
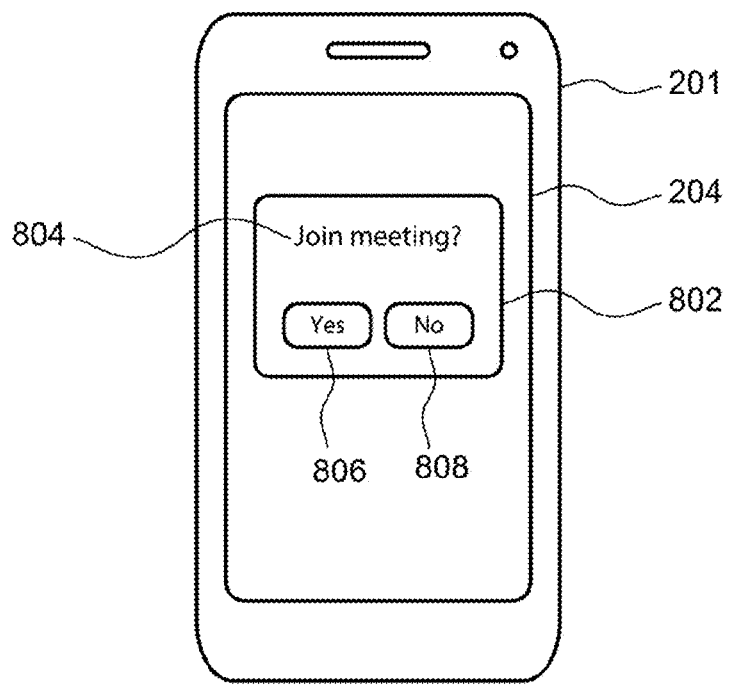
FIG. 4 illustrates an electronic device in accordance with example embodiments of the present disclosure which display a preview of a second application in a notification.

In some examples, the preview may be made in a "pop-up" notification which is displayed on the display 204 in response to the electronic device 204 receiving a first user input. One such example is shown in FIG. 4. There, a panel 802 is displayed to the user which contains some text 804 in which the preview is displayed. The panel 802 also contains a button 806 for acting on the preview, and a button 808 for dismissing the preview.

In other examples, the preview may be displayed to the user when the electronic device 201 receives a first user input. The first user input may take a variety of forms, depending on the various input interfaces 206 that may be used with the electronic device 201. For example, the first user input may comprise a key press on a keyboard, a click in a certain region using a mouse, or a gesture using a touchscreen. In response to receiving the first user input, a preview for a second application is displayed to the user.

The preview may be displayed to the user using any of a number of methods, depending on the capabilities and/or the connected peripherals of the electronic device 201. In some examples, the preview may be displayed on the display 204 associated with the electronic device 201. The preview may comprise one or more standard graphical user interface components, such as a text box, a button, an image or any other arrangement as would be understood by the skilled person.

In some embodiments, the displaying the preview for a second application may comprise displaying a representation of an output of the second application. For example, the preview may comprise at least a portion of an output from a graphical user interface that would be displayed on executing the second application. In some cases, a relevant portion of the graphical output may be determined, such as by using context data (as will be described below). The relevant portion of the graphical output may then be displayed. For example, if the second application is a calendar application with a graphical user interface that displays a full month, a relevant portion may be a portion of the graphical user interface displaying the current day or week. The graphical user interface may be retrieved by actually executing the second application. In some cases, this may be achieved by simulating the execution of the application, for example in a "sandbox". That is, the application is executed in such a way that it will have no permanent effect, such as on stored data or the like. In this manner, the user can see a true representation of the application without the risk of unwanted data alteration. In some examples, a third application may be executed to provide a graphical user interface. A portion of this user interface from the third application can then be displayed as the preview. The third application will typically be related to the application in the preview, and may be a specifically designed more limited version.

Figure 5A:
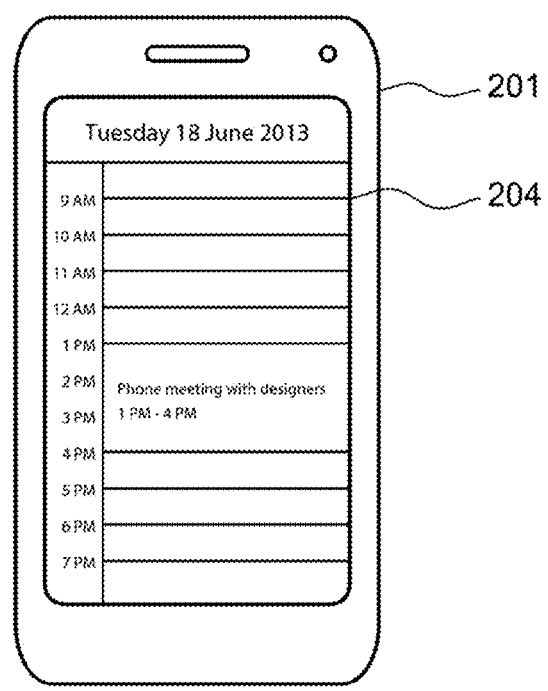
FIGS. 5A to 5C illustrate electronic devices in accordance with example embodiments of the present disclosure in which a panel extends from one side of the display.
Figure 5B:
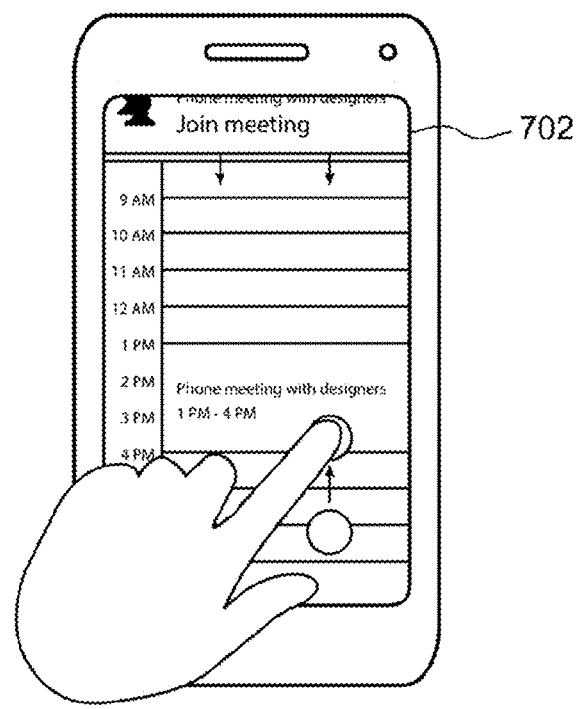
Figure 5C:
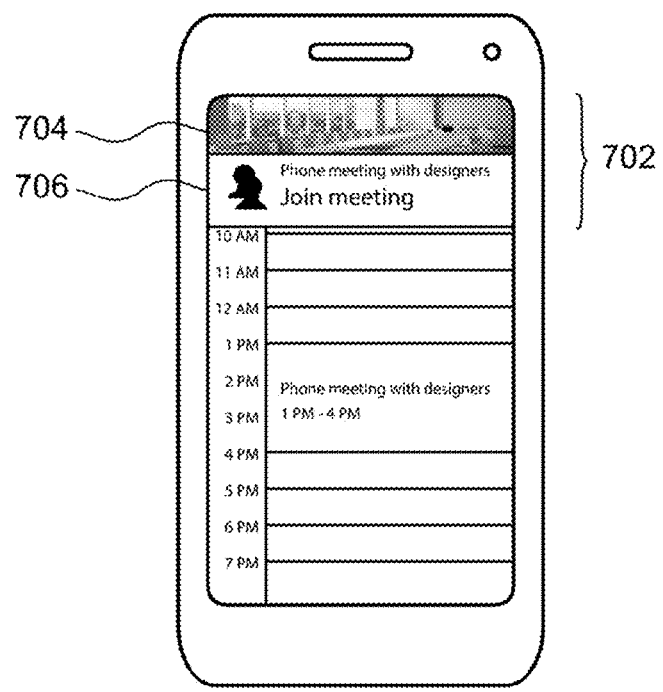

Example embodiments are shown in FIGS. 5A and 5B. In FIG. 5A, the electronic device 201 is executing a first application. At FIG. 5B, the user provides a user input to the electronic device 201 in the form of a touch-screen gesture. In response to receiving the user input, the electronic device 201 displays, on the display 204, a panel 702. The panel 702 may appear to extend from the one side of the display 204 (in this case, from the top), at the same time as the user's gesture progresses. In the panel 702 a preview of a second application is displayed. In this case, the preview comprises an image 704 and a text description 706.

The preview additionally or alternatively comprises some information, typically information relevant to the first application. For example, if the preview is of a calendar application, the information may comprise a list of the user's appointments in the upcoming month. The information may be filtered such that a relevant portion of the information is determined and only that relevant portion is displayed. This may be of particular benefit when the area in which the information can be displayed is limited. The relevant portion of the information may be determined using context data (as will be described below). The information may be received from the application (in this case, from the calendar application) or from another application, generally related to the application.

In some embodiments, the preview for the second application may be displayed simultaneously with the user interface of the first application. In other words, the user interface of the first application continues to be displayed while the preview is displayed.

In some embodiments, this is done by reducing the size of the output of the user interface of the first application. For example, rather than a "full screen" output, the user interface of the first application may be displayed in a "window" or the like. In this manner, the preview can also be displayed. This allows the user to compare the user interface of the first application as well as the preview for the second application.

If the user indicates that the second application should be executed, the first application may then be hidden and/or may cease to be displayed. If the user dismisses the preview, the first application may revert to its original size.

Executing the Second Application

Once the preview has been displayed, the user can indicate to the electronic device 201 whether they wish for the application to be executed. The absence of any indication by the user for a predetermined duration may be interpreted by the electronic device 201 in any of three ways: that the application should be executed, that the application should not be executed, or that the electronic device 201 should wait for an indication to be provided. In general, it is useful for the electronic device to consistently apply only one of these, however in some situations, it may be useful to apply a combination.

The user can indicate that the application should be executed by providing a second user input. In response to receiving the second user input, the electronic device 201 executes the application. Accordingly, the user interface of the first application can cease to be displayed, and a user interface of the second application can be displayed in its place.

In some embodiments, content displayed in the user interface of the second application is based at least in part on the content displayed in the user interface of the first application. For example, if the user interface of the first application contains content which provides an address, and the second application is a map application, the user interface of the map application may display a map output centred on that address.

The second application may comprise one or more user controls for receiving data from the user. Based on the content in the user interface of the first application, one or more of the user controls may be provided with a default value which comprises at least part of the content. For example, the content in the user interface of the first application may include a date and time. The user interface of the second application may be a calendar application which includes user controls for inserting a new calendar event which include a "date" user control, a "time" user control and a "description" user control. When the user interface of the second application is displayed, the "date" and "time" user controls may be provided with the date and time from the content of the first application as default values. This can then be changed by the user as desired.

In some cases, the second user input may simply be a repetition of the first user input. In other cases, the second user input may be different from the first user input.

The electronic device 201 may display a prompt to the user to indicate the appropriate second user input. For example, a message may be displayed, to convey to the user to input a particular gesture or key combination. An animation of the user input may alternatively or additionally be displayed. The prompt may only be displayed after a predetermined amount of time, such as about 5 seconds.

Alternatively, when the preview has been displayed, the user may not wish for the application to be executed. In such a case, the user may be able to provide a third user input different to the second user input. On receiving the third user input, the electronic device 201 may cease displaying the preview. This may mean that the preview may be hidden and/or may be no longer displayed. The third user input may comprise discontinuing the first user input and/or reversing or undoing the first user input.

In some examples, the selection of the second application (for which the preview is displayed) is based at least in part on the content in the user interface of the first application (which is currently being displayed to the user).

Multiple Previews

In some embodiments, a plurality of applications may be determined, with previews for one or more of the applications being displayed to the user. Previews for each of the plurality can be displayed to the user at the same time, although where there are a large number of applications, this may prove unwieldy. Thus in some embodiments, only a limited number of previews (or indeed a single preview) may be displayed at one time. In some embodiments, each application has an associated confidence measure. The confidence measure relates to the estimated likelihood that the user will wish to execute that application. For example, a measure of 0.8 associated with an email application means that the electronic device 201 has calculated there is an 80% chance that the user will decide to executed the email application. In many cases, the confidence measure will be based on the observed history of the user.

The electronic device 201 may select a subset of the applications for which to display previews to the user. The subset may be selected by taking a number n (at least 1, but possible up to all) of the applications having the highest associated confidence measures. In other words, the applications are ordered as a list by their associated confidence measures, and the first n items in the list are selected. Other means of selecting a subset of the applications for which to display previews to the user are also possible.

The user may be able to select between the plurality of applications. In some examples, the electronic device 201 may be configured to receive a fourth user input, preferably different to the first user input, the second user input and the third user input. On receiving the fourth user input, the electronic device 201 may display a preview for a third application in the plurality different from the second application. The third application may be the application having the next highest confidence measure. In some cases, a plurality of fourth user inputs can be received, and a preview for a different third application can be displayed each time. When there is no third application having a lower associated confidence measure, a preview for the application with the highest confidence measure may then be displayed (that is, the list loops back to the start).

Figure 6:
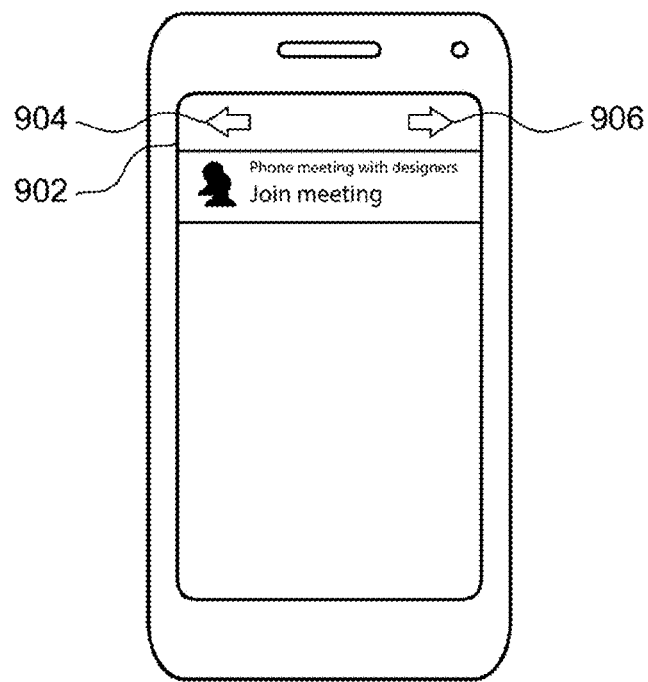
FIG. 6 illustrates an electronic device in accordance with example embodiments of the present disclosure which display selecting among multiple previewed applications.

An example of selecting among multiple applications is shown in FIG. 6. Here, a panel 902 shows a preview for a second application. The panel also provides buttons 904, 906 (in the form of arrows) to move among the applications. In particular, button 904 may cause the previous preview in the list to be displayed, and button 906 may cause the subsequent preview in the list to be displayed.

In some embodiments, the user may be able to "dismiss" the application for which a preview is displayed. This may mean a preview for the application is not displayed again for a predetermined amount of time. Alternatively or additionally, a preview for the application will not be displayed until a further first user input is received.

In some embodiments, the electronic device 201 may be configured to receive a fifth user input, preferably different to the first user input, the second user input, the third user input and the fourth user input. On receiving the fifth user input, the application is removed from the plurality of applications. In some cases, "removing" may mean recording that a preview for the application must not be displayed again. In other cases, the plurality is stored as an ordered data structure, such as a list, and the removed application is removed from the data structure. Subsequently, a preview for another application may be displayed to the user, preferably in the same manner as described above in relation to receiving the fourth user input.

In some embodiments, the reason for displaying a preview for a particular application may be made available to the user. The user may initiate the display, such as based on a user input, or it may be displayed in a separate menu, or may always be displayed when a preview is displayed.

User Interactions

In some embodiments, the electronic device 201 may comprise a touch-sensitive user input device, such as a touch-screen. In such embodiments, one or more of the various user inputs may be touch gestures. Of course, a user may be able to provide alternative user inputs using different input interfaces 206 attached to the electronic device 201 to achieve the same result. For example, a swipe gesture may be equivalent to a mouse movement for the purposes of the first user input.

The user inputs may be adapted to be received at the touch-sensitive user input device, such as a touchscreen. In some cases, a gesture area may be provided for user input of gestures. The gesture area may be the whole of the touchscreen. Alternatively, a part of the touchscreen may be designated as the gesture area (for example, by a box displayed on the display).

The first user input may comprise a first swipe gesture generally in a first direction from a start point to an end point. For example, the first user input may be an upwards swipe.

The start point for the first user input may be located outside of the gesture area, such that the swipe gesture may appear to begin (for the purposes of processing the swipe gesture) from the very edge of the gesture area. Alternatively, the start point may be located is an edge region of the gesture area, such as in the lower about 5% or about 25% of the gesture area by length and/or width.

The end point of the first user input may be located at least a predetermined minimum distance in generally in the first direction from the start point for the gesture to be registered as a suitable first user input. For example, the end point may be at least about 25% of the gesture area by length and/or width. The end point may be located at most a predetermined maximum distance in generally in the first direction from the start point for the gesture to be registered as a suitable first user input. For example, the end point may be at most about 75% of the gesture area by length and/or width.

In some examples, an end point which is below the minimum distance or above the maximum distance from the start point may be regarded as a different user input, each of which may trigger a different action. For example, a shorter swipe may trigger an action in the application currently being executed on the electronic device 201. A longer swipe may trigger opening a menu or the like.

Figure 7:
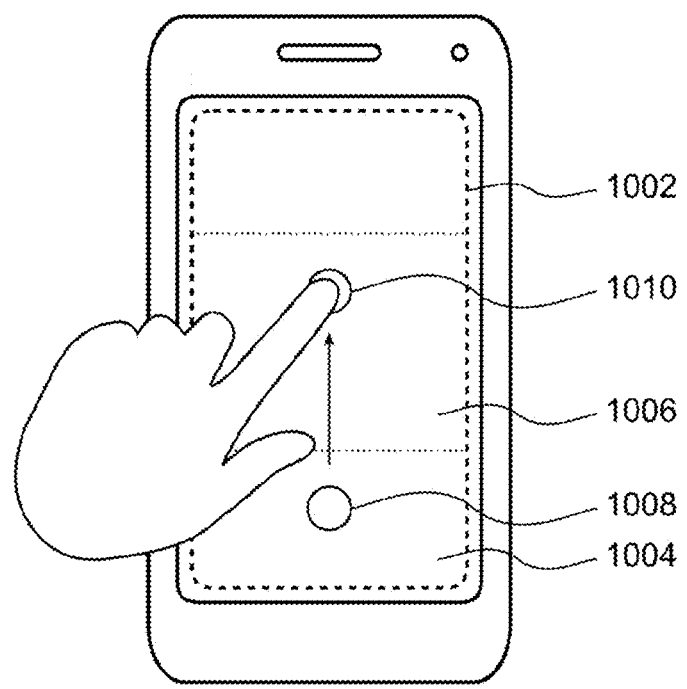
FIG. 7 illustrates an electronic device in accordance with example embodiments of the present disclosure receiving a first user input.

An example is shown in FIG. 7. The first user input begins at point 1008 within the bottom quarter 1004 of gesture area 1002. The first user input continues in a generally upward direction to the end at point 1010 in the middle half 1006 of the gesture are 1002.

In some embodiments, the first gesture may comprise a substantially stationary hold gesture. This may follow a swipe gesture. In such a case, the preview may be displayed only as long as the hold gesture is maintained. Once the hold gesture is released, the electronic device 201 may (optionally after a predetermined delay, such as about 500 ms) cease displaying the preview and/or may hide the preview.

Figure 8A:
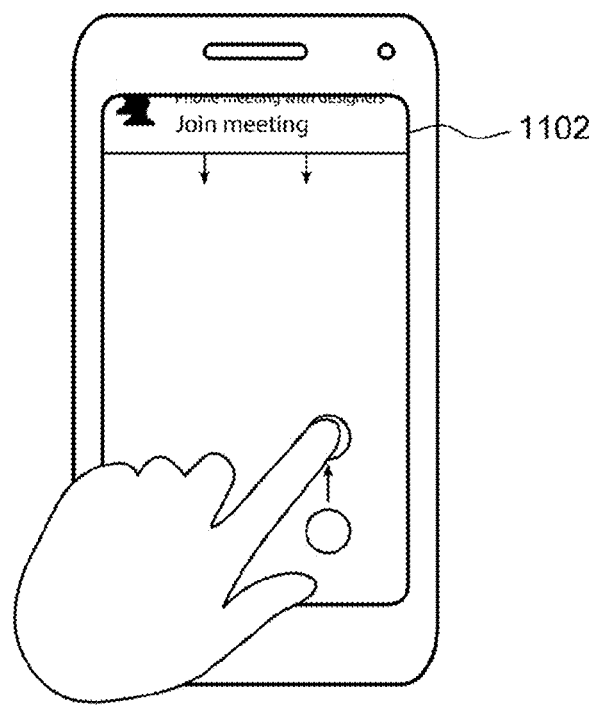
FIGS. 8A and 8B illustrate electronic devices in accordance with example embodiments of the present disclosure in which a panel recedes based on user input.

For example, in FIG. 8A, the generally upwards motion of the first user input caused a panel 1102 displaying a preview to extend from the top of the display.

Figure 8B:
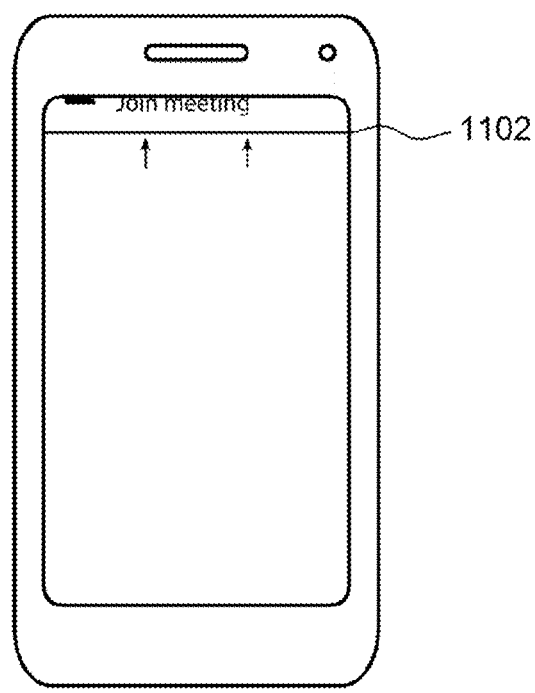

In FIG. 8B, the user has released the hold gesture of the first user input, and the panel 1102 has begun to recede in the opposite manner in which it was shown. In this case, it slowly recedes upwards to the top of the display. Although not shown, the user may be able to "catch" the receding panel, by performing a subsequent swipe and/or hold gesture, thereby causing the panel and the preview to be re-displayed.

In some cases, however, even if the user releases the gesture, the panel 1102 continues to be displayed.

In some embodiments where the electronic device 201 comprises a touch-sensitive user input device, the second user input may comprise a touch input. It may be a continuation of the first input. For example, where the first input is a swipe gesture generally in a first direction (for example from a first start point to a first end point), the second user input may be a swipe gesture in generally the same first direction (for example, from a second start point to a second end point, the first end point and the second start point being around the same place). In some cases, the first start point may be located inside the gesture area, and/or the second start point may be located around the edge (or within around 10% of the edge) of the gesture area.

Figure 9:
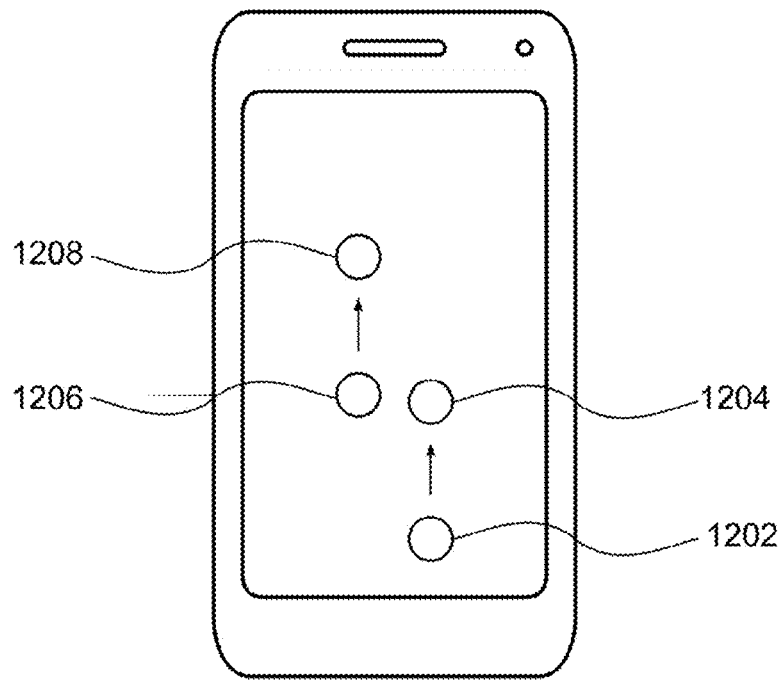
FIG. 9 illustrates an electronic device in accordance with example embodiments of the present disclosure receiving a second user input.

An example is shown in FIG. 9. Here, the first user input passes from first start point 1202 generally upwards to first end point 1204. After some amount of time, the second user input proceeds from second start point 1206 (which is generally in the same location as first end point 1204) generally upwards to second end point 1208.

In some embodiments where the electronic device 201 comprises a touch-sensitive user input device, the third user input may comprise a touch input. In some examples, the third user input is a swipe gesture generally in a second direction (for example, from a third start point to a third end point), the second direction being generally opposite to the first direction of the first user input. The third start point may be generally in the same location as the first end point. The third end point may be generally in the same location as the first start point and/or may be outside or at the edge of the gesture area.

In embodiments where the first user input comprises a hold gesture, the third user input may comprise releasing the hold gesture.

In some embodiments where the electronic device 201 comprises a touch-sensitive user input device, the fourth user input may comprise a touch input. In some examples, the fourth user input is a swipe gesture generally in a third direction, preferably different from the first direction and the second direction. In some cases, the third direction is a direction generally perpendicular to the first direction and/or the second direction.

In some embodiments where the electronic device 201 comprises a touch-sensitive user input device, the fifth user input may comprise a touch input. In some examples, the fifth user input is a swipe gesture generally in a fourth direction, preferably different from the first direction, the second direction and the third direction. In some cases, the fourth direction is a direction generally perpendicular to the first direction and/or the second direction. Additionally or alternatively, the fourth direction may be a direction generally opposite the third direction.

In some embodiments, the electronic device is configured to provide a preview in response to receipt of the first user input. That is, the first user input may be regarded as a global user input. Regardless of the application currently running, the gesture will be received and processed in substantially the same manner. For example, a separate process may be running at the electronic device 201 to which the first input is passed by the operating system, instead of to the currently running application as may be usual.

Multitasking

In some embodiments, the electronic device 201 may be configured to allow for multitasking, that is, to allow two or more applications to run simultaneously.

In such embodiments, immediately prior to receiving the first user input, the electronic device 201 may be executing a first application. When the electronic device 201 receives the first user input and displayed a preview for a second application, and when that second application is executed, the first application may be suspended. Suspending may comprise serialising the state of the first application as the time the second application is executed and/or may comprise simply maintaining processes associated with the first application in a "suspended" or "paused" state.

Additionally or alternatively, the first application may simply be terminated. In some cases, a hybrid approach may be used. For example, the first application may first be suspended. When a termination condition is satisfied (such as a predetermined amount of time passing from the beginning of the suspension and/or the electronic device 201 is required to free resources, such as memory), the first application may then be terminated. This allows for a potential fast resumption of the first application, without permanently reserving the resources needed for maintaining the application in a suspended state.

In some embodiments, the first application is suspended and/or terminated when the preview is displayed to the user (for example, in response to the electronic device 201 receiving the first user input). When the preview is no longer shown to the user, the first application may be resumed and/or restarted. This may be in response to the electronic device 201 receiving the third user input.

In some embodiments, the first application can be suspended as soon as the first user input is received.

In some embodiments, the electronic device 201 may be configured to receive a sixth user input, for "switching" between the first application and the second application. In such a case, the suspended application is resumed, and the executing application is suspended.

Machine Learning

One or more of the processes described above may be performed by or in association with a machine learning module. The machine learning module may be implemented as a software module at the electronic device 201. In some embodiments, the machine learning module may be provided at a remote server, and the electronic device 201 may communicate with the remote server using known communication techniques, such as via an Internet connection.

In use, the machine learning module may be provided with an input. The input may include one or more of user profile data, context data and/or historical data. On the basis of the input, the machine learning module may be able to determine one or more applications. The electronic device 201 may then receive, from the machine learning module, the one or more applications.

In some embodiments, the machine learning module makes use of a machine learning algorithm. The machine learning algorithm may be a supervised learning algorithm, such as a neural network or a naive Bayes classifier. The skilled person will appreciate alternative supervised learning algorithms may be used. The supervised learning algorithm is initially trained on a training set, which may be based on user profile data, context data and/or historical data together with observed actions of the user. Additionally or alternatively, a training set may be manually constructed, with each entry in the constructed training set including one or more conditions as an input and one or more actions as an output. For example, an entry in the constructed training set may include "receiving a communication which includes a date D" as a condition and "open the calendar application to show date D" as an action.

In some embodiments, a natural language processing module may also be provided to analyse the content of some of the context data. The natural language processing module may have access to the user profile data, the context data and/or the historical data. For example, on receiving a message, the natural language processing module may analyse the message to determine one or more context indicators (such as text in a message which reads "12.30 pm", "1 June" or "Central Park"), categorise the relevant context indicators into categories (such as a time, a date or a location), and provide the context indicators to the machine learning module. As will be appreciated by the skilled person, the natural language processing module may be use any natural language processing algorithm, many of which are well known in the art. For example, the natural language processing module may use a series of regular expressions to determine and categorise the one or more context indicators.

In some embodiments, the natural language processing module may also convert an original form of the context indicators into a normalised form (preferably in accordance with a relevant standard) of the data. The conversion may in some cases be done based on the user profile data and/or the context data. The conversion may in some cases involve communication with a separate data server, such as a location server.

As an example, three pieces of data might be isolated from three received messages: "12.30 pm", "half past twelve" and "twelve thirty". The natural language processing module may access the local time zone of the user in the user profile data (in this case, EST/UTC-05:00) and convert each of the three times to the same normalised form in accordance with ISO 8601: "12:30-05:00". In some embodiments, the machine learning module learns from user input. This may be due to historical data relating to the user input being stored.

In some examples, when an application for which a preview was displayed is executed, the machine learning module is adapted based on the acceptance of the preview. This may mean that, based on the same input, the confidence measure for that application would be higher in subsequent evaluations.

In some examples, when an application for which a preview was displayed is executed, the machine learning module is adapted based on the acceptance of the preview along with certain context data. For example, time, location or other recently executed applications may be used to provide context to the acceptance.

In some examples, an application for which a preview was displayed is not executed (perhaps because it is dismissed and/or the user views the preview and chooses not to execute the application), the machine learning module is adapted based on the rejection of the preview. This may mean that, based on the same input, the confidence measure for that application would be lower in subsequent evaluations. A different level of adaptation may occur depending on the type of rejection. A dismissal may result in a much less likely chance of displaying a preview for the same application again, as opposed to the user simply not performing the application.

Endpoints

For simplicity, the description above refers to "an application" for which a preview may be shown. However, it should be appreciated that in some embodiments, one or more of the applications may be associated with one or more endpoints within that application.

Thus, in some cases, the electronic device 201 may determine one or more of the endpoints. Each of the endpoints can be associated with an application. In some cases, multiple endpoints can be associated with the same application. In such a case, for example, previews may be displayed for an endpoint, rather than for an application, and an application may be executed with a view to displaying the user interface for a particular endpoint associated with that application.

Each endpoint may comprise a predetermined procedure within the associated application and/or may comprise a particular entry-point or user interface view within the application.

For example, given an email application, there may be a first endpoint for sending an email to a particular addressee which has a "compose email" user interface, an endpoint for arranging a meeting which has a "create meeting" user interface and an endpoint for viewing a calendar which has a "view calendar" user interface.

Endpoints may be selected based on one or more items of data displayed in the user interface of the first application, for example, using the context indicators. One or more of the context indicators may have an associated endpoint. For example, an "email address" context indicator may be associated with a "compose email" endpoint of an email application.

When the second application is executed, the electronic device 201 may identify an endpoint associated with the second application. This may be selected via machine learning module as described above. The user interface of the second application may then be adapted based on the identified endpoint.

EXAMPLES

An example of how an endpoint is determined will now be described. First, a location is received: "Central Park".

The natural language processing module sends a location request to a location server, which returns a series of options: "Central Park, New York City, N.Y., United States", "Central Park, Wuzhong, Suzhou, China" and "Central Park, Brooklyn, Wellington, New Zealand". The natural language processing module may access the current location of the user in the user profile data (in this case, New York City) and select the location closest to the user: "Central Park, New York City, N.Y., United States". Alternatively or additionally, the natural language processing module may normalise a location to a coordinate set.

In use, the machine learning algorithm may produce, as an output, a plurality of applications and, for each of the applications in the plurality of application, an associated confidence measure as described above.

An example will now be described to show how the machine learning module and the natural language processing module function to provide one or more previews for applications. The machine learning module in this example may have five endpoints available: make a phone call (optionally to a particular contact) using a phone application, send an email (optionally to a particular contact) using an email application, display a map (optionally centred a specific location) using a map application, display directions (optionally from a first location to a second location) using the map application, and display a calendar (optionally at a particular date) using a calendar application.

The user receives an SMS message from a contact "Anna Friedgard" reading "Let's meet at Central Park near the statue of Christopher Columbus before the client pitch".

This message (as context data) is passed to the natural language processing module to determine the context indicators. The natural language processing module determines that "Central Park" and "near the statue of Christopher Columbus" are both locations and "before the client pitch" is a time. The natural language processing module uses a location server to provide "Central Park, New York City, N.Y., United States" and "Columbus Circle, New York City, N.Y., United States" as locations. The natural language processing module makes use of the user's calendar to determine that the "client pitch" is at 1 pm on 1 Sep. 2013, and therefore reasons that before the client pitch is 12 pm on 1 Sep. 2013 and returns "2013-09-01 12:00-05:00" as a time.

Based on the output context data from the natural language processing module, the machine learning algorithm determines endpoints for one or more applications. In this case, the machine learning algorithm determines seven potential endpoints:

- display the calendar at 2013-09-01 12:00-05:00 in the calendar application;
- display a map of Central Park, New York City, N.Y., United States in the map application;
- display a map of Columbus Circle, New York City, N.Y., United States in the map application;
- display directions from the current location to Central Park, New York City, N.Y., United States in the map application;
- display directions from the current location to Columbus Circle, New York City, N.Y., United States in the map application;
- insert an event in the calendar beginning at 2013-09-01 12:00-05:00 at Central Park, New York City, N.Y., United States in the calendar application; and
- insert an event in the calendar beginning at 2013-09-01 12:00-05:00 at Columbus Circle, New York City, N.Y., United States in the calendar application; and
- calling Anna Friedgard in the phone application.

The machine learning algorithm then computes a confidence measure for each of the determined endpoints in the manner described above:

| Endpoint | Confidence measure |
| --- | --- |
| display the calendar at 2013 Sep. 1 12:00-05:00 | 0.4 |
| display a map of Central Park, New York City, NY, United States, | 0.55 |
| display a map of Columbus Circle, New York City, NY, United States | 0.5 |
| display directions from the current location to Central Park, New York City, NY, United States, | 0.8 |
| display directions from the current location to Columbus Circle, New York City, NY, United States, | 0.7 |
| insert an event in the calendar beginning at 2013 Sep. 1 12:00-05:00 at Central Park, New York City, NY, United States | 0.45 |
| insert an event in the calendar beginning at 2013 Sep.1 12:00-05:00 at Columbus Circle, New York City, NY, United States | 0.6 |
| calling Anna Freidgard | 0.2 |

One or more of the endpoints (such as the endpoint with the highest confidence measure) can then be selected. Subsequently, the application associated with a selected endpoint can also be selected, and displayed preview of the application displayed to the user in the manner described above. In some cases, the preview can be based on the selected endpoint. For example, the preview can be an extract of a graphical user interface associated with the endpoint.

An example of the methods described above will now be illustrated with reference to FIGS. 10A-10C.

Figure 10A:
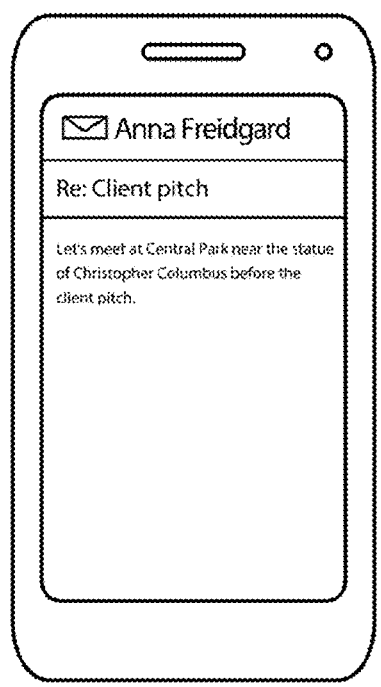
FIGS. 10A to 10C illustrate electronic devices in accordance with example embodiments of the present disclosure in which a second application is executed.

At FIG. 10A, the electronic device 201 has received an SMS message which reads "Let's meet at Central Park near the statue of Christopher Columbus before the client pitch".

Figure 10B:
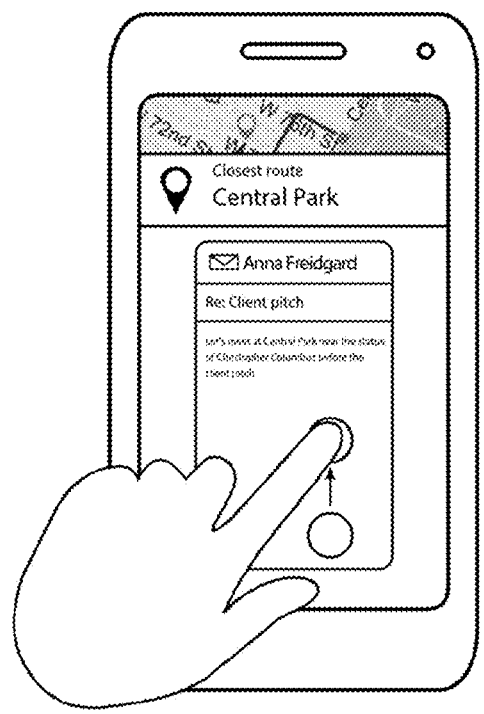

At FIG. 10B, the electronic device 201 receives a first user input in the form of a swipe in a first direction (generally upwards) from a first start point (which is outside of the gesture area provided by the display of the electronic device 201) to a first end point (which is at approximately 33% of the height of the gesture area).

On receiving the first user input, a natural language module and a machine learning module analyse the context data, including the message, and determine that a preview for a maps application to show directions from the user's current location to the destination of Central Park should be displayed.

Thus, as the first user input is received, the electronic device 201 shrinks the currently displayed graphical output of the first (currently executing) application into a first panel and displays a preview for the maps application. In this case, the preview comprises an extract of a graphical output of the maps application.

Figure 10C:
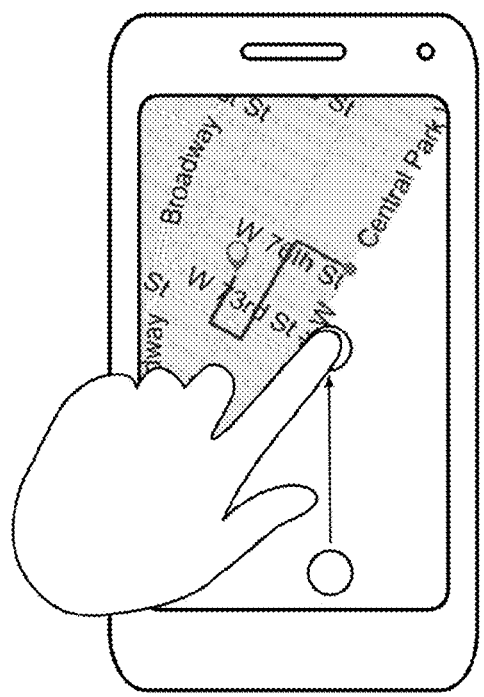

At FIG. 10C, the electronic device receives a second user input in the form of a swipe in the first direction from a second start point (which is at approximately 33% of the height of the gesture area) to a second end point (which is at approximately 80% of the height of the gesture area). Here, the second user input is effectively a continuation of the first user input. On receiving the second user input, the maps application is executed.

Another example will now be described with reference to FIGS. 11A to 11C.

Figure 11A:
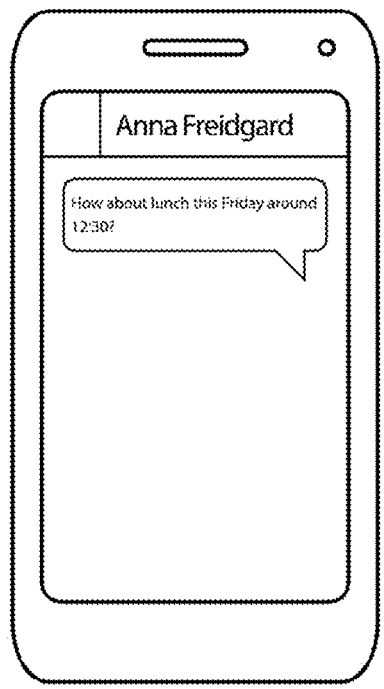
FIGS. 11A to 11C illustrate electronic devices in accordance with example embodiments of the present disclosure in which a second application is not executed.

At FIG. 11A, the electronic device 201 has received an SMS message which reads "How about lunch this Friday around 12:30".

Figure 11B:
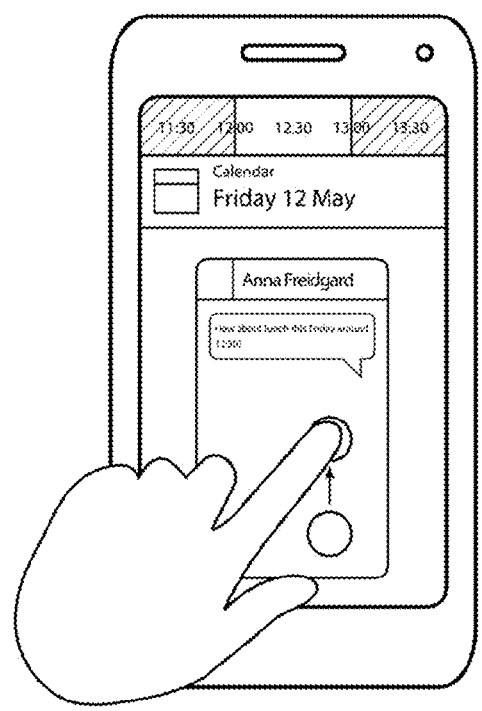

At FIG. 11B, the electronic device 201 receives a first user input in the form of a swipe in a first direction (generally upwards) from a first start point (which is outside of the gesture area provided by the display of the electronic device 201) to a first end point (which is at approximately 33% of the height of the gesture area).

On receiving the first user input, a natural language module and a machine learning module analyse the context data, including the message, and determines that a preview for a calendar application which will show calendar information for Friday May 12 should be displayed.

Thus, as the first user input is received, the electronic device 201 shrinks the currently displayed graphical output of the first (currently executing) application into a first panel and displays a preview for the calendar application, which includes displaying relevant information. In this case, the preview comprises an extract of a graphical output of the calendar application.

Figure 11C:
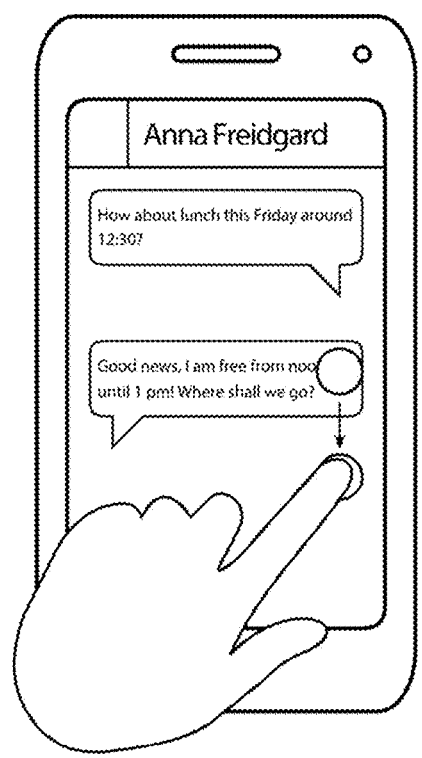

At FIG. 11C, the electronic device receives a third user input in the form of a swipe in a second direction (namely, generally downwards) generally opposite the first direction from a third start point (which is at approximately 33% of the height of the gesture area) to a third end point (which is outside the gesture area). On receiving the third user input, the electronic device 201 un-shrinks the first application. The user, having received the necessary information without the second application being executed, can now respond.

The embodiments described above allow an electronic device to determine what applications a user executes in a reasonably predictable way. The electronic device can then display previews for one or more of the application to the user, thereby allowing the user to omit the typical repetitive user input that is otherwise required. The user is thereby provided with a more satisfying user experience.

It is to be understood that the present disclosure includes all permutations of combinations of the optional features set out in the embodiments described above. In particular, it is to be understood that the features set out in the appended dependent claims are disclosed in combination with any other relevant independent claims that may be provided, and that this disclosure is not limited to only the combination of the features of those dependent claims with the independent claim from which they originally depend.

Embodiments have been described herein by way of example and these embodiments are not intended to be limiting. Rather, it is contemplated that some embodiments may be subject to variation or modification without departing from the spirit and scope of the described embodiments.

The invention claimed is:

1. An electronic device, comprising:
one or more processors; and
memory comprising instructions which when executed by the one or more processors cause the electronic device to:
 display content in a user interface of a first application;
 detect a first user input;
 determine one or more items of data from the content displayed in the user interface of the first application;
 determine one or more endpoints at least partly in dependence on the one or more items of data, each endpoint displayed by an associated application in a plurality of applications and comprising at least one of a predetermined procedure from a plurality of procedures within the associated application, and the associated application includes the plurality of procedures and is different from the first application;
 calculate a confidence measure for each endpoint, wherein the confidence measure represents a likelihood of execution based on historical usage of the electronic device for an application associated with an endpoint;
 select the endpoint having the highest confidence measure;
 select the application associated with the endpoint as a second application; and
 display at least a preview for the second application.

2. The electronic device of claim 1, wherein the preview is based at least in part on the content in the user interface of the first application.

3. The electronic device of claim 1, wherein the preview is based at least in part on an output of the second application and the output of the second application is based at least in part on the content in the user interface of the first application.

4. The electronic device of claim 1, wherein the memory comprises further instructions which when executed by the one or more processors cause the device to:
detect a second user input; and
responsive to the second user input:
 cease displaying the user interface of the first application;
 execute the second application; and
 display content in a user interface of the second application;
wherein the content displayed in the user interface of the second application is based at least in part on the content displayed in the user interface of the first application.

5. The electronic device of claim 4, wherein the first user input comprises a first gesture and the second user input comprises a second gesture.

6. The electronic device of claim 4, wherein the first gesture comprises a swipe gesture substantially in a first direction and the second gesture comprises a continuation of the first user input.

7. The electronic device of claim 4, wherein the memory comprises further instructions which when executed by the one or more processors cause the electronic device to:
detect a third user input; and
responsive to third user input:
 cease displaying the user interface of the second application; and
 display content in the user interface of the first application.

8. The electronic device of claim 1, wherein the memory comprises further instructions which when executed by the one or more processors cause the device to:
detect a third user input; and
responsive to the first user input, suspending execution of the first application; and
responsive to the third user input:
 ceasing displaying the preview for the second application; and
 resuming execution of the first application.

9. The electronic device of claim 1, wherein the preview for the second application is based on the selected endpoint, the selected endpoint being associated with the second application.

10. The electronic device of claim 1, wherein determining one or more endpoints comprises:

determining a data type for each of the one or more items of data; and wherein each endpoint is associated with one or more of the determined data types.

11. The electronic device of claim 1, wherein the preview comprises at least part of a graphical user interface of the second application.

12. The electronic device of claim 1, wherein the preview comprises content from the second application.

13. The electronic device of claim 1, wherein the user interface of the first application is displayed while the preview for the second application is displayed.

14. The electronic device of claim 13, wherein the user interface of the first application is displayed at a reduced size while the preview is displayed.

15. A method in a portable electronic device, comprising:
displaying content in a user interface of a first application;
detecting a first user input;
determining one or more items of data from the content displayed in the user interface of the first application;
determining one or more endpoints at least partly in dependence on the one or more items of data, each endpoint displayed by an associated application in a plurality of applications and comprising a predetermined procedure from a plurality of procedures within the associated application, and the associated application includes the plurality of procedures and is different from the first application;

calculating a confidence measure for each endpoint, wherein the confidence measure represents a likelihood of execution based on historical usage of the electronic device for an application associated with an endpoint;
selecting the endpoint having the highest confidence measure;
select the application associated with the endpoint as a second application; and
displaying at least a preview for the second application.

16. The method of claim 15, wherein the preview is based at least in part on an output of the second application and the output of the second application is based at least in part on the content in the user interface of the first application.

17. The method of claim 15, further comprising:
detecting a second user input; and
responsive to the second user input:
ceasing displaying the user interface of the first application;
executing the second application; and
displaying content in a user interface of the second application;
wherein the content displayed in the user interface of the second application is based at least in part on the content displayed in the user interface of the first application.

18. The method of claim 15, wherein the preview comprises at least part of a graphical user interface of the second application.

* * * * *

UNITED STATES PATENT AND TRADEMARK OFFICE
CERTIFICATE OF CORRECTION

PATENT NO. : 9,710,126 B2  
APPLICATION NO. : 14/056722  
DATED : July 18, 2017  
INVENTOR(S) : Christopher Engstrom, Dan Zacharias Gardenfors and David Andrew Brown Page 1 of 1

It is certified that error appears in the above-identified patent and that said Letters Patent is hereby corrected as shown below:

In the Claims

Column 19, Line 25, In Claim 15, after "comprising" insert -- at least one of --

Signed and Sealed this  
Twelfth Day of September, 2017

Joseph Matal  
*Performing the Functions and Duties of the*  
*Under Secretary of Commerce for Intellectual Property and*  
*Director of the United States Patent and Trademark Office*